United States Patent [19]
Leiser

[11] Patent Number: 5,819,718
[45] Date of Patent: Oct. 13, 1998

[54] PORTABLE GRILL

[76] Inventor: Michael D. Leiser, 1582 Hwy. 80 South, Babcock, Wis. 54413

[21] Appl. No.: 912,270

[22] Filed: Aug. 18, 1997

[51] Int. Cl.$^6$ ....................................................... F24B 3/00
[52] U.S. Cl. ............................................. 126/30; 248/156
[58] Field of Search ........................ 126/29, 30; 248/156

[56] References Cited

U.S. PATENT DOCUMENTS 3,344,780  10/1967  Anderson ................................... 126/30

*Primary Examiner*—Carroll B. Dority
*Attorney, Agent, or Firm*—Margaret M. Liss; Stroud, Stroud, Willink, Thompson & Howard

[57] ABSTRACT

A portable grill includes a vertical post, a grill support member, a grill grate for mounting on the grill support member, and a locking member for attaching the grill support member to the vertical post. The locking member has four sidewalls disposed in parallel spaced opposed pairs forming a rectangular tube with open opposed ends. The locking member includes a slot penetrating three of the sidewalls. The slot forms an angled opening on one of the sidewalls and also 180° opposed "J" shaped openings on an opposed pair of sidewalls. The "J" shaped openings each have a curved side portion corresponding to one half circumference portion of the circumference of the post. The angled opening is contiguous with the "J" shaped openings. The post is retained in position when it is received through the angled opening and rests against the opposing curved side portions of the "J" shaped openings receiving full 360° contact. A grill accessory holder and a portable grill kit are included.

19 Claims, 10 Drawing Sheets

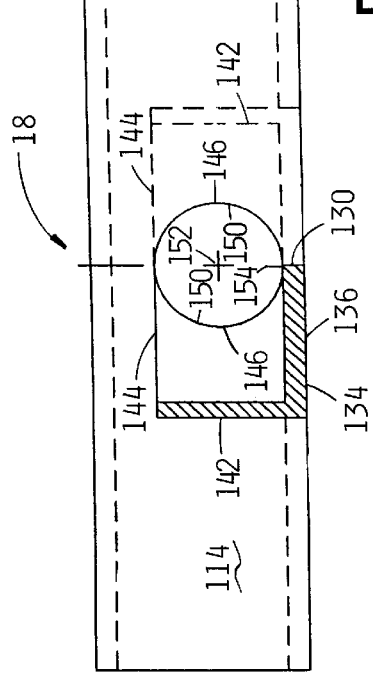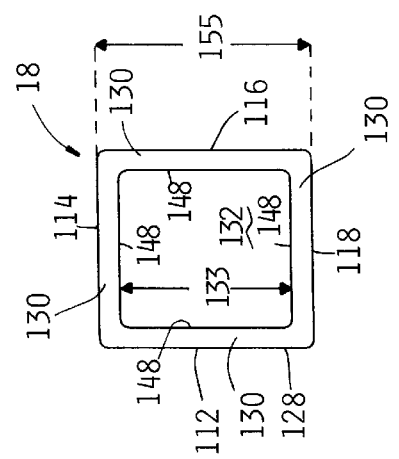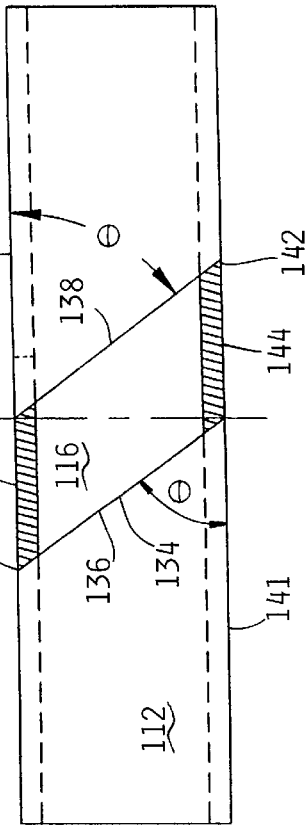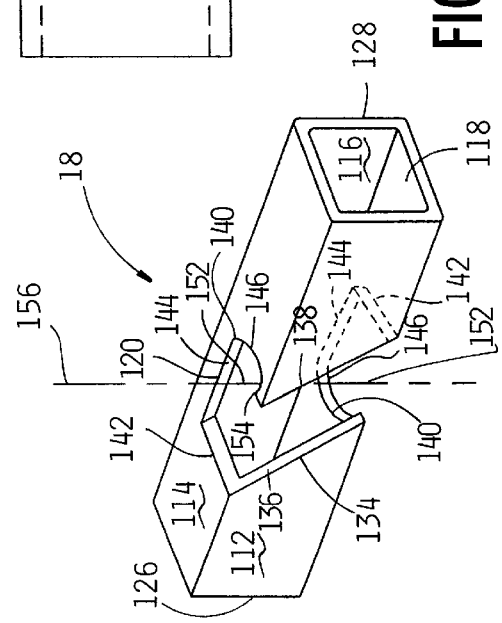

PORTABLE GRILL

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

This invention relates generally to barbeque grills and in particular to portable grills having a grill grate, wherein the grill grate may be easily rotated, moved up and down and/or in and out.

Portable barbeque grills for outdoor cooking food and grill mounted accessory holders are well known and very popular. There is a recognized need in the camping and outdoor recreation industry for portable grills which are low in price, simple to manufacture, easy to assemble and disassemble, easy to use, and which provide stable, adjustable positioning of the grill, e.g., vertical, rotational and translational positioning. The prior art has attempted to respond to some of these problems, and includes U.S. Patents issued to Hall et al. (U.S. Pat. No. 5,355,867), Kleefeld (U.S. Pat. No. 5,307,797), Nudo et al. (U.S. Pat. No. 4,979,490), Ruble (U.S. Pat. No. 4,553,525), Claire et al. (U.S. Pat. No. 4,083,345), Lombardi (U.S. Pat. No. 3,483,816), Groff (U.S. Pat. No. 3,195,531), Stone (U.S. Pat. No. 2,960,979) and Hardin et al. (U.S. Pat. No. 2,522,223). The grills disclosed in these patents typically have an upright post or angled post, a grill supporting member, a grill grate and a locking member, to lock the grill supporting member to the post. The locking members of many of these portable grills have multiple element and/or complex locking devices, such as, hook-like elements, coils, screw members, coupling members with fingers and jaws, etc. which engage the post. These locking members make the portable grill difficult to quickly assemble/disassemble and use. Furthermore, not all of the portable grills grates are capable of the three degrees of movement needed in outdoor cooking, e.g. full 360° rotational movement, vertical (up-down) movement and translational (in-out horizontal) movement of the grill grate about the post member. Additionally, the portable grill may be subject to lateral instability requiring tabs for engagement of the locking member about the post.

Thus, not withstanding the many known practical design problems for portable grills, the art has not adequately responded to date with the introduction of a low price, easy to manufacture, easy to assemble/dissemble, portable grill having full 360° rotation, up/down vertical movement, in/out translational movement of the grill grate about the post and lateral stability where the locking member is a simple one-piece article which engages in a full 360° contact in opposing 180° spaced arcs about the post. Nor, has the art responded with a grill accessory holder which utilizes the aforementioned locking member as an element.

BRIEF SUMMARY OF THE INVENTION

The present invention provides a portable grill, a locking member for use in a portable grill, a grate adapter mechanism for use in a portable grill, a grill accessory holder and a portable grill kit.

The foregoing, and other advantages of the present invention, are realized in one aspect thereof in a portable grill comprising a vertical post, a grill grate, a grill support member and a locking member for attaching the grill support member to the vertical post. The vertical post has a post diameter, post circumference and post axis. The grill support member has a grill support bar with two opposite ends. A handle is on one of the ends and a grill grate receiver is on the other end. The grill grate mounts upon the grill grate receiver.

The locking member has four sidewalls disposed in two parallel spaced opposed pairs, with the pairs generally perpendicular to each other and forming a tube having opposed open ends. The locking member has a slot therein penetrating three of the sidewalls with the fourth sidewall unpenetrated by the slot. The slot forms an acute angled opening penetrating one sidewall of one of the pairs of sidewalls. The angled opening has two angled sides spaced in parallel relationship to each other. The angled opening is dimensioned for receiving the post diameter. The slot forms a pair of identically dimensioned "J" shaped openings, with each "J" shaped opening disposed in one of the two opposed sidewalls of the other pair of sidewalls. Each "J" shaped opening has a beveled side portion, a linear side portion and a half circle curved side portion. The beveled side portion is parallel to the open ends of the locking member. The linear side portion is parallel with the fourth sidewall of the locking member. The curved side portion is dimensioned to receive a one half circumference portion of the post circumference. The linear side portion extends between the beveled side portion and the curved side portion. Each of the curved side portions of the "J" shaped openings are disposed in an opposed 180° orientation with the other curved portion of the "J" shaped opening.

The grill grate receiver includes a cylinder having an inner throughhole penetrating the cylinder axially, a cylinder circumference having a longitudinal slot therein, and two cylinder ends. One of the cylinder ends has a beveled angled portion surrounding the inner throughhole. One end of the grill support bar is affixed to the longitudinal slot on the cylinder circumference.

The grill grate has a plurality of spaced rods and a center rib bisecting the grill grate and intersecting the spaced rods. The portable grill further comprises a grate adapter mechanism. The grate adapter mechanism has an upper adapter plate, a lower adapter plate, and fasteners for fastening the upper plate to the lower adapter plate. The upper adapter plate has a plurality of openings therethrough for accepting the fasteners. The lower adapter plate has a plurality of openings therethrough aligned with and dimensioned to align with the openings on the upper adapter plate. The lower adapter plate has an upper surface adjacent to the grill grate and an opposite lower surface. The upper surface has a groove thereon dimensioned to accept the rib. The lower adapter plate has a grate adapter pin protruding from the lower surface. The grate adapter pin is suitably dimensioned to fit into the inner throughhole of the cylinder of the grill support member.

The portable grill further comprises a grill accessory holder having a grill accessory locking member and an arm attached to the grill accessory locking member for holding a grill accessory. The grill accessory holder further comprises a shelf attached to the arm member. The grill accessory holder further comprises at least one hook attached to the arm member.

In another aspect thereof, the present invention provides a locking member for use with a portable grill having (a) a vertical post having a post diameter, post circumference and post axis, (b) a grill support member having a grill support bar with two opposite ends and a handle on one of the ends, (c) a grill grate and (d) a grill grate receiver on the other end of the support bar, for mounting the grill grate upon. The locking member is for attaching the grill support member to the vertical post. The locking member comprises four sidewalls disposed in two parallel spaced opposed pairs, with the pairs generally perpendicular to each other and forming a tube having opposed open ends. The locking member has a slot therein penetrating three of the sidewalls with the fourth sidewall unpenetrated by the slot. The slot forms an acute angled opening penetrating one sidewall of one of the pairs of sidewalls. The angled opening has two angled sides spaced in parallel relationship to each other. The angled opening is dimensioned for receiving the post diameter. The slot forms a pair of identically dimensioned "J" shaped openings, with each "J" shaped opening disposed in one of the two opposed sidewalls of the other of the pair of sidewalls. Each "J" shaped opening has a beveled side portion, a linear side portion and a half circle curved side portion. The beveled side portion is parallel to the open ends of the locking member. The linear side portion is parallel with the fourth sidewall of the locking member. The curved side portion is dimensioned to receive a one half circumference portion of the post circumference. The linear side portion extends between the beveled side portion and the curved side portion. Each of the curved side portions of the "J" shaped opening is disposed in an opposed 180° orientation with the other curved portion of the "J" shaped opening.

In a further aspect thereof, the present invention provides a grate adapter mechanism for use in a portable grill having (a) a grill grate having a plurality of spaced rods and a center rib bisecting the grill grate and intersecting the spaced rods, (b) and a grill support member having a grill grate receiver and a grill support bar. The grill grate receiver includes a cylinder having an inner throughhole penetrating the cylinder axially, a cylinder circumference having a longitudinal slot on the cylinder circumference, and two cylinder ends. One of the cylinder ends has a beveled angled portion surrounding the inner throughhole. The grill support bar is affixed to the longitudinal slot on the cylinder circumference. The grate adapter mechanism comprises an upper adapter plate, a lower adapter plate, and fasteners for fastening the upper plate to the lower adapter plate. The upper adapter plate has a plurality of openings therethrough for accepting the fasteners. The lower adapter plate has a plurality of openings therethrough aligned with and dimensioned to correspond to the openings on the upper adapter plate. The lower adapter plate has an upper surface adjacent to the grill grate and an opposite lower surface. The upper surface has a groove thereon dimensioned to accept the rib. The lower adapter plate has a grate adapter pin protruding from the lower surface. The grate adapter pin is suitably dimensioned to fit into the inner throughhole of the cylinder of the grill support member.

In yet a further aspect thereof, the present invention provides a grill accessory holder for use in a portable grill having a vertical post having a post diameter, post circumference and post axis. The grill accessory holder comprises a grill accessory locking member and an arm attached to the grill accessory locking member. The grill accessory locking member has four sidewalls disposed in two parallel spaced opposed pairs, with the pairs generally perpendicular to each other and forming a tube having opposed open ends. The locking member has a slot therein penetrating three of the sidewalls with the fourth sidewall unpenetrated by the slot. The slot forms an acute angled opening penetrating one sidewall of one of the pairs of sidewalls. The angled opening has two angled sides spaced in parallel relationship to each other. The angled opening is dimensioned for receiving the post diameter. The slot forms a pair of identically dimensioned "J" shaped openings, with each "J" shaped opening disposed in one of the two opposed sidewalls of the other of the pair of sidewalls. Each "J" shaped opening has a beveled side portion, a linear side portion and a half circle curved side portion. The beveled side portion is parallel to the open ends of the locking member. The linear side portion is parallel with the fourth sidewall of the locking member. The curved side portion is dimensioned to receive a one half circumference portion of the post circumference. The linear side portion extends between the beveled side portion and the curved side portion. Each curved side portion of the "J" shaped openings is disposed in an opposed 180° orientation with the other curved portion of the "J" shaped opening. The grill accessory holder further comprises a shelf attached to the arm member. The grill accessory holder further comprises at least one hook attached to the arm member.

In still yet a further aspect thereof, the present invention provides a portable grill kit comprising a vertical post, a grill support member, a grill grate and a locking member for attaching the grill support member to the vertical post. The vertical post has a post diameter, post circumference and post axis. The grill support member has a grill support bar with two opposite ends. A handle is on one of the ends and a grill grate receiver is on the other end. The grill grate receiver is for mounting the grill grate upon. The locking member is as previously described. The portable grill kit includes a grill grate receiver as previously described. The portable grill kit includes a grill grate adapter mechanism for use with a grill grate having a plurality of spaced rods and a center rib bisecting the grill grate and intersecting the spaced rods. The grate adapter mechanism is as previously described.

The portable grill kit further comprises a grill accessory holder attached to the grill accessory locking member. The grill accessory locking member is as previously described. The grill accessory holder of the portable grill kit further comprises a shelf attached to the arm member. The grill accessory holder of the portable grill kit further comprises at least one hook attached to the arm member.

In still yet another aspect thereof, the present invention provides a portable grill comprising a vertical post, a grill support member, a grill grate and a locking member for attaching the grill support member to the vertical post. The vertical post has a post diameter, post circumference and post axis. The grill support member has a grill support bar with two opposite ends, a handle on one of the ends and a grill grate receiver on the other end. The grill grate is for mounting on the grill grate receiver. The locking member forms a four sided tubular member having opposed open ends and a locking member vertical axis disposed equidistant from the open ends and penetrating a pair of the sides of the tubular member. The locking member has a slot therein. The slot has an angled opening and also has a pair of spaced 180° opposed half circle openings. Each half circle opening is dimensioned to accept a one half circumference portion of the post circumference. Each half circle opening has a center on the locking member vertical axis, with the centers of the half circle openings being spaced from each other. The angled opening has two angled sides spaced in parallel relationship to each other. The angled opening is dimensioned for receiving the post diameter. The angled opening is noncoincident with the locking member vertical axis. When the locking member is engaged with the post circumference, the locking member vertical axis is coincident with the post axis.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWING(S)

The preferred exemplary embodiment of the present invention will hereinafter be described in conjunction with the appended drawing wherein like designations refer to like elements throughout and in which:

FIG. 6 is a perspective view of the locking member of the portable grill of FIG. 1;

FIG. 7 is a front view of the locking member of FIG. 6, the rear view being a mirror image thereof;

FIG. 8 is side view of the locking member of FIG. 6;

FIG. 9 is a top plan view of the locking member of FIG. 6;

DETAILED DESCRIPTION OF THE INVENTION

This invention relates generally to barbeque grills and, in particular, to portable grills. The invention is characterized by the ability of the grill grate to be easily rotated, moved up and down and/or in and out by moving a locking member. The invention also pertains to grill accessory holders which are used with a portable grill, to grate adapter mechanisms which are used with a portable grill and to a portable grill kit. Accordingly, the present invention will now be described in detail with respect to such endeavors; however, those skilled in the art will appreciate that such a description of the invention is meant to be exemplary only and should not be viewed as limitative on the full scope thereof.

Figure 1:
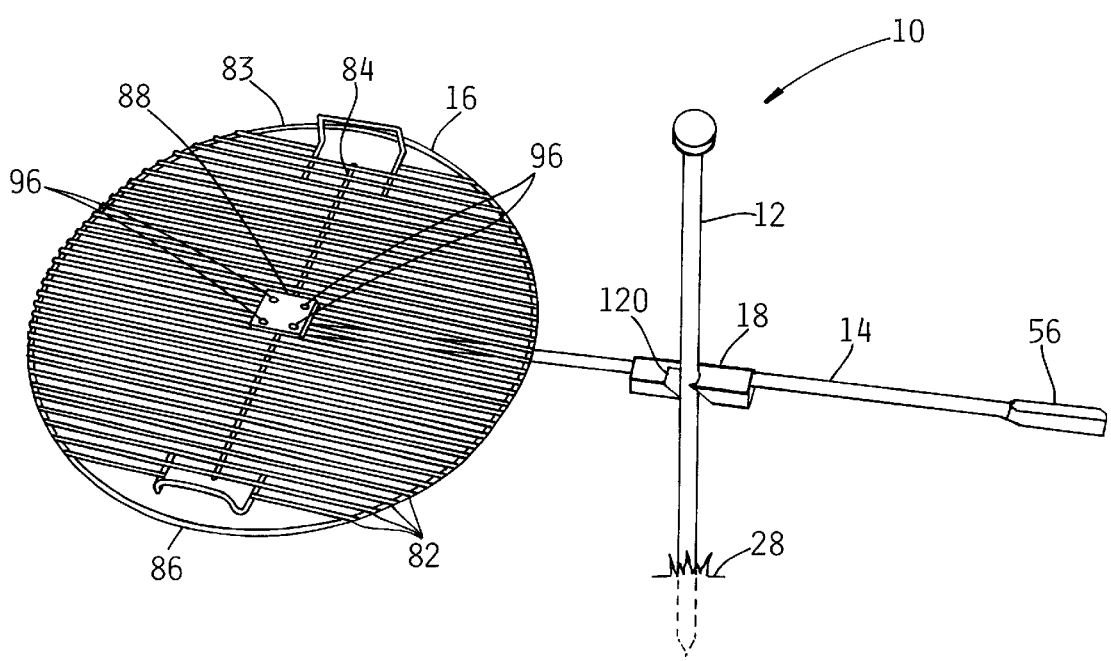
FIG. 1 is a perspective view of the portable grill of the present invention.
Figure 2:
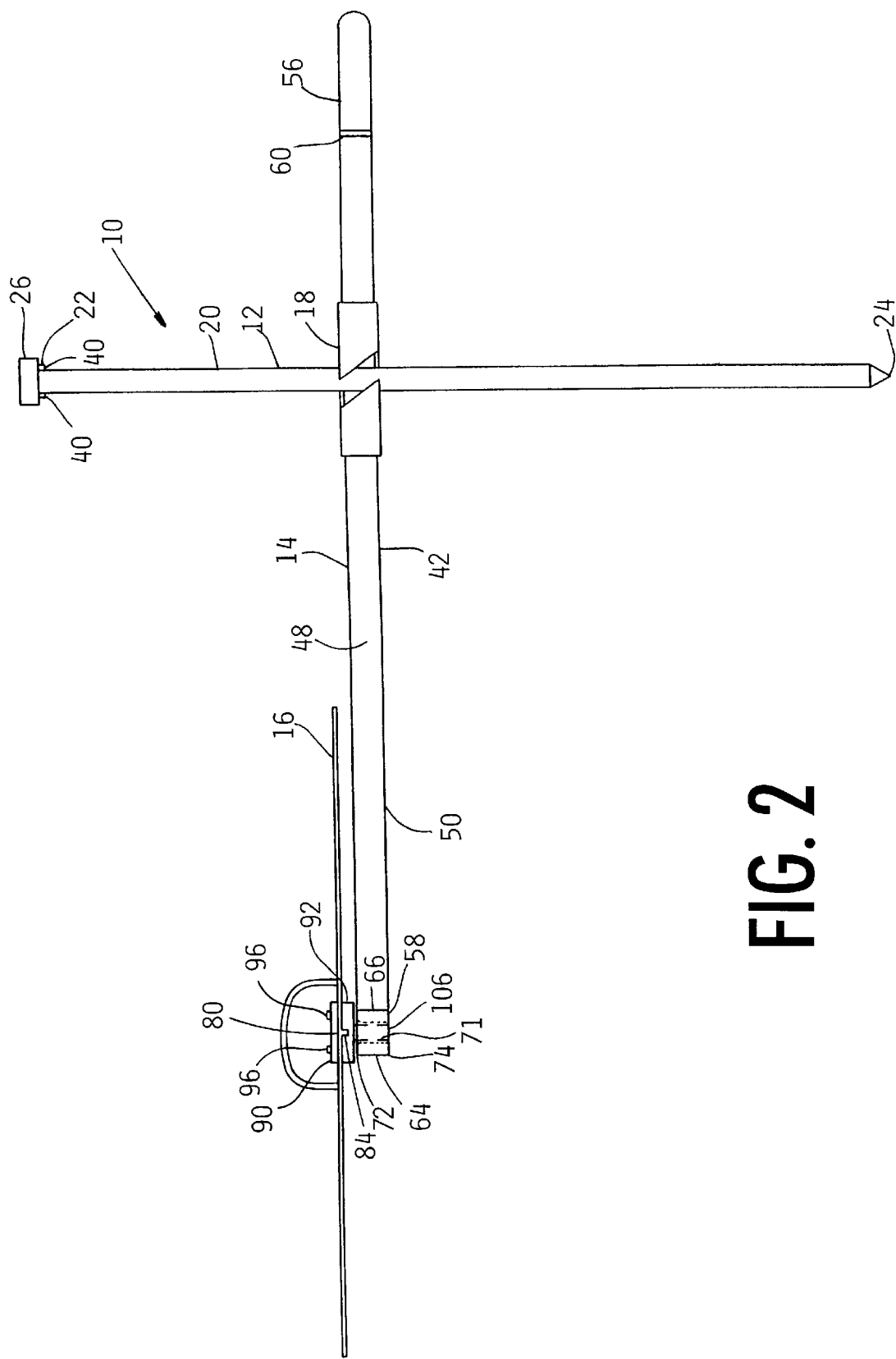
FIG. 2 is a side view of the portable grill of FIG. 1 with the circular rim of the grill grate removed.
Figure 3:
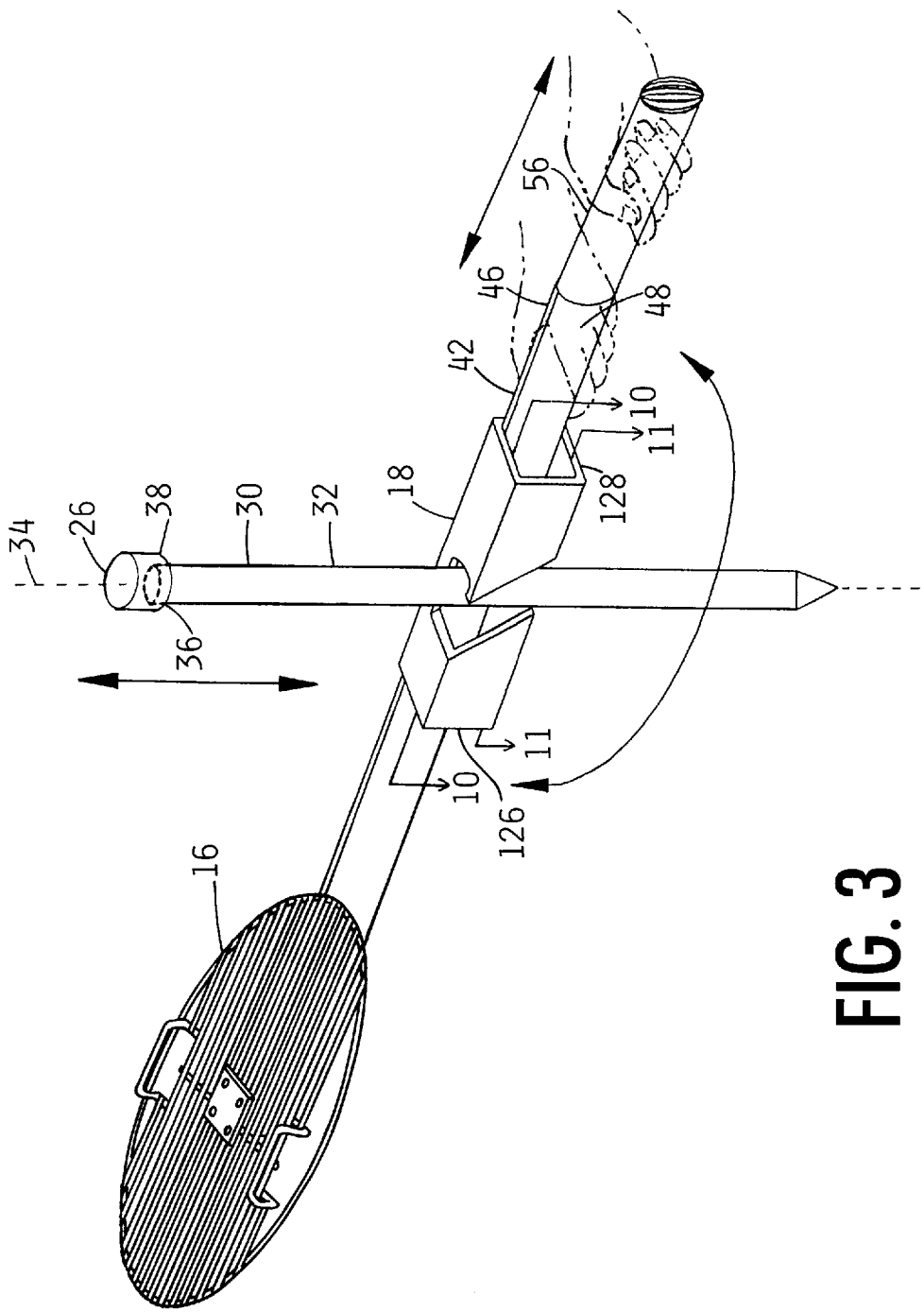
FIG. 3 is another view of the portable grill of FIG. 1 showing the movement of the grill grate about the post with the hands of a user shown in phantom on the handle and on the grill support bar.
Figure 4:
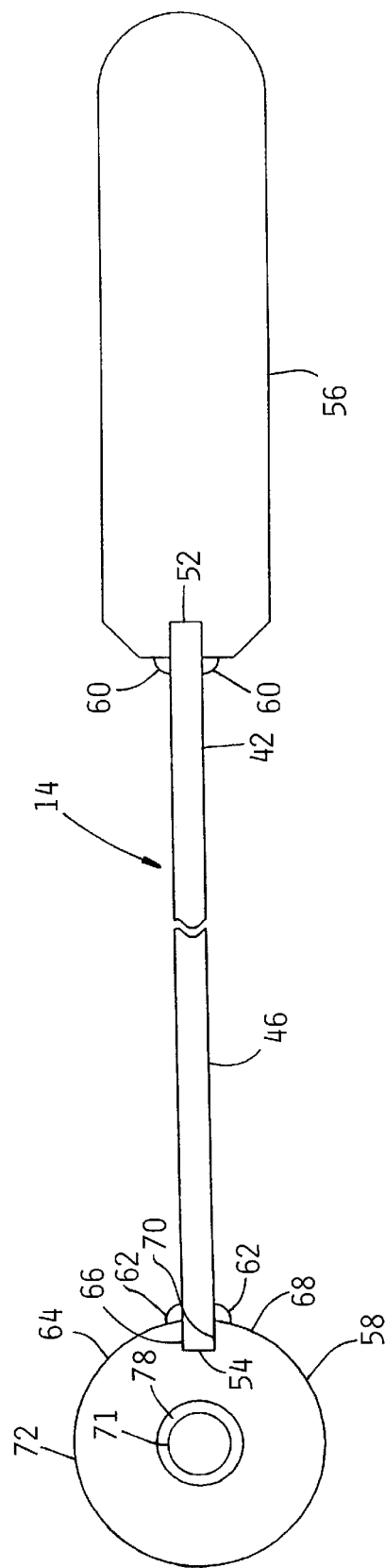
FIG. 4 is a top plan view of the grill support bar of the portable grill of FIG. 1 with the grill removed.

Reference is initially made to FIGS. 1, 2 and 3 depicting a barbeque grill, specifically a portable grill 10 according to the present invention. Portable grill 10 is made of metal and includes a vertical post 12, a grill support member 14, a grill grate 16 for mounting on the grill support member 14, and a locking member 18 for attaching the grill support member 14 to the vertical post 12. Preferably, the vertical post 12, the grill support member 14, and the locking member 18 are made of steel.

Vertical post 12 has a cylindrical post body 20, and two ends, an upper end 22 and a lower end 24. Upper end 22 is topped with a post cap 26. Upper end 22 is opposite lower end 24 which is suitably pointed for driving into the ground 28. Post body 20 has a post diameter 30, a post circumference 32, and a post vertical axis 34. The post cap 26 has a recessed counter bore portion 36 suitably dimensioned to accept a portion 38 of the upper end 22 of the cylindrical post body 20. The post cap 26 is preferably welded to the cylindrical post body 20, most preferably using a gas tungsten arc weld 40. Alternatively, the post body 20 and post cap 26 is fabricated of one piece of metal.

As best shown in FIGS. 1–4, the grill support member 14 has a grill support bar 42 which is preferably a rectangular bar having a generally uniform rectangular crosssection. The grill support bar 42 has a bar width dimension 46, a bar height dimension 48 and a bar length dimension 50. The bar width dimension 46 and the bar height dimension 48 are related to the structure of the locking member 18, as described hereinafter. The bar 42 has two opposite ends 52, 54. A grill handle 56 is affixed to one of the ends of the bar 42. A grill grate receiver 58 is affixed to the other end of the bar 42. The grill handle 56 and the grill grate receiver 58 are preferably welded to the rectangular grill support bar 42, most preferably using a gas tungsten arc welds, 60, 62, respectively. Alternatively, the grill handle 56 and grill grate receiver 58 may be affixed to the bar 42 in other ways known in the art, or may be fabricated in one piece with the bar 42. The grill grate receiver 58 is preferably a cylinder 64 having a circumference 68 with a longitudinal slot 66. The slot 66 on the circumference 68 of the cylinder 64 is suitably dimensioned to receive a portion 70 of the end 54 of the grill support bar 42. An inner throughhole 71 penetrates the cylinder 64 axially. The cylinder 64 has two ends 72, 74, with one end 72 oriented toward the grill grate 16, and the other end 74 oriented to the pointed lower end 24 of the post 12. The end 72 of the cylinder 64 oriented towards the grill grate 16, has a beveled (angled) portion 78 surrounding the inner throughhole 71.

A commercially available metal grill grate 16 is affixed to the grill support member 14, with a center 40 of the grill grate 16 centered about the grill grate receiver 58. The grill grate 16 has preferably spaced rods 82 mounted on a circular rim 83, and most preferably, a center rib 84 bisecting the grill grate 16 and intersecting the rods 82. Most preferably, the rib 84 is disposed on an underside/lower side 86 of the grill grate 16. Preferably, the grill grate 16 is fastened in a grate adapter mechanism 88 which is then positioned in the inner throughhole 71 of the cylinder 64 of the grill grate receiver 58. Thus, the grill grate 16 is suitably mounted on grill grate receiver 58.

Figure 5:
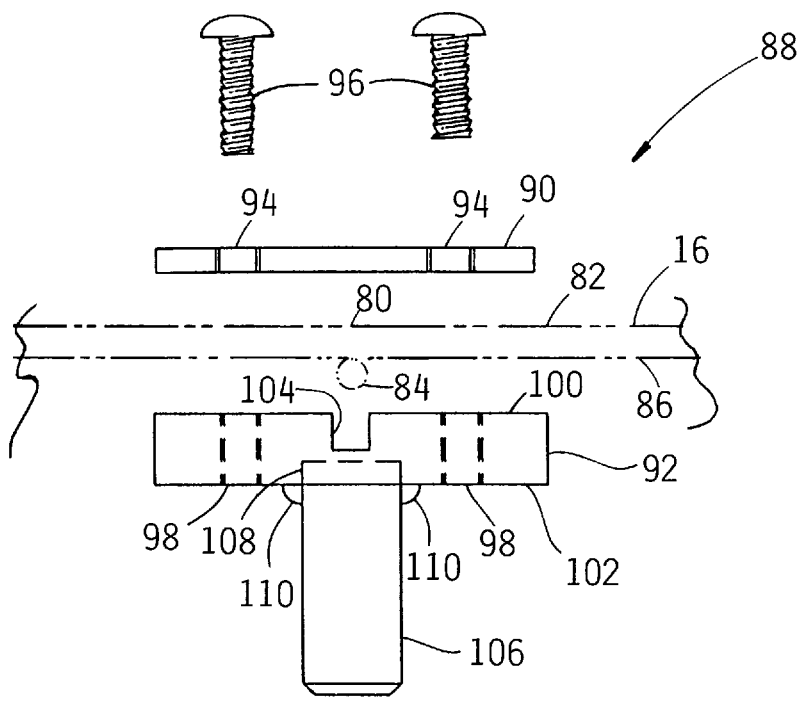
FIG. 5 is a side view of the exploded grate adapter mechanism of the portable grill of FIG. 1 with the grill shown in phantom and partially cut away.

As best shown in FIGS. 1, 2 and 5, the grate adapter mechanism 88 has an upper adapter plate 90 and a lower adapter plate 92. The upper adapter plate 90 is preferably a generally square plate with a plurality of openings 94 therethrough for accepting fastening hardware 96. The lower adapter plate 92 is also preferably a generally square plate, of corresponding shape to the upper adapter plate 90, and with a plurality of openings 98 aligned with and dimensioned to correspond in diameter to openings 94 of the upper adapter plate 90. The lower adapter plate 92 has a upper surface 100 which is adjacent the grill grate 16 and an opposite lower surface 102. Most advantageously, the upper surface 100 has a groove 104 centered therein and suitably dimensioned to accept the rib 84 on the lower side 86 of the grill grate 16. This groove 104 provides a feature of added stability to the grill 10, preventing slippage of the grill grate 16 when food items (not shown) are moved, removed and/or added to the grill grate 16 when cooking.

The lower adapter plate 92 also has a grate adapter pin 106 protruding from the lower surface 102. The grate adapter pin 106 is preferably countersunk into a recess 108 in the lower surface 102 of the lower adapter plate 92. The upper adapter plate 90, the lower adapter plate 92 and grate adapter pin 106 are made of metal. The grate adapter pin 106 is most preferably welded into place in recess 108 using a gas tungsten arc weld 110. Alternatively, as is known in the art, other suitable methods of joining may be used to join the grate adapter pin 106 to the lower adapter plate 92, or the two members, 106 and 92 may be fabricated as one piece.

The grate adapter pin 106 is suitably dimensioned to releasably fit into the inner throughhole 71 of cylinder 64 of the grill gate receiver 42 of grill support member 14. As used herein, the term "releasably fit" is meant to refer to the adapter pin 106 being dimensioned smaller in diameter than the diameter of the inner throughhole 71, preferably adapter pin 106 is approximately at least 0.038 cm (0.015 inches) smaller than the diameter of the inner throughhole 71, so that the grill grate 16 may be easily mounted and dismounted from the grill grate receiver 58.

The upper adapter plate 90 and the lower adapter plate 92 are positioned to be centered about the center 80 of the grill grate 16. The grill grate 16 is sandwiched between the grate adapter plates 90, 92 with the rib 84 resting in the groove 104 on the upper surface 100 of the lower adapter plate 92. Suitable fastening hardware 96 such as, but not limited to, button head screws or stainless steel cap screws are threaded through the openings 94, 98 to fasten the upper and lower adapter plates 90, 92 to the grill grate 16.

Alternatively, a grill grate is used which does not have a central rib intersecting the rods (not shown). In this case, the grill grate is sandwiched between the upper and lower adapter plates 90, 92 and fastened with fastening hardware 96 as previously described, with the upper and lower adapter plates 90, 92 centered about a center of the grill grate.

Alternatively, the upper and lower adapter plates 90, 92 may have other geometric shapes, such as, but not limited to circles, ellipses, triangles, rectangles or other polygons, and need not be square in shape. It is preferable that the upper and lower adapter plates 90, 92 be identically sized and shaped, but not necessarily have a same thickness dimension, since they may be fabricated of different metals.

As shown in FIGS. 1 and 2, after the grill grate 16 is mounted in the grate adapter mechanism 88, the grate adapter pin 106 is positioned into the inner throughhole 71 of the cylinder 64 of the grill grate receiver 58 when the grill grate is ready to be used. The beveled (angled) portion 78 in the cylinder 64 of the grill grate receiver 58 accommodates the weld 110 on the grate adapter plate 92.

As best shown in FIGS. 1–3 and 6–11, the locking member 18 of the present invention is a simple one piece tubular member having four sidewalls 112, 114, 116, 118, a slot 120 (penetrating three of the sidewalls 112, 114, 118) and two opposing open ends 126, 128. The fourth sidewall 116 is not penetrated by the slot 120. Each of the sidewalls 112, 114, 116, 118 has a sidewall thickness 130; preferably each sidewall thickness is identical in dimension. The sidewalls 112, 114, 116, 118 are disposed in parallel spaced opposed perpendicular pairs, with two opposed sidewalls 112, 116 making up one pair and the remaining two opposed sidewalls 114, 118 making up the second pair. The sidewalls 112, 114, 116, 118 may be soldered or welded together (not shown). The locking member 18 is preferably fabricated of a tubular metal having four rectangular sidewalls 112, 114, 116, 118 with a generally uniform, preferably square, interior crosssection 132, and two open opposed ends 126, 128. The square crosssection 132 has a square side dimension 133. The square side dimension 133 is an inner distance between the pair of sidewalls 112 and 116 and between the pair of sidewalls 114 and 118. The square crosssection 132 is sufficiently large to permit the grill handle 56 to be inserted through the opposing open ends 126, 128 of the locking member 18.

The slot 120 is suitably dimensioned to accommodate the post diameter 30 and the post circumference 32. The slot 120 includes an angled opening 134 on one of the sidewalls 112 and a pair of 180° opposed "J" shaped openings 140 disposed on an opposed pair of sidewalls 114, 118. The angled opening 134 has two angled sides 136, 138, which are spaced in a parallel relationship to each other. The angled opening 134 is sufficiently dimensioned between the angled sides 136, 138 to closely receive the post diameter 30 of the post 12. As used herein, the term "closely receive" the diameter, is meant to refer to the opening being within approximately −0.013 cm/−0.000 cm (+0.005 inches/−0.000 inches) of the post diameter. Since the "J" shaped openings 140 are mirror images of each other, the numbering of the respective corresponding sides of each of the "J" shaped openings 140 will herethroughout be identical.

The "J" shaped openings 140, each have a beveled side portion 142, a linear side portion 144 and a half circle curved side portion 146. The beveled side portion 142 is parallel to the open ends 124, 126 of the locking member 18. The linear side portion 144 is parallel to the fourth sidewall 116 which is not penetrated by slot 120 and is spaced from the fourth sidewall 116. The spacing of the linear side portion 144 from the fourth sidewall 116 is sufficient to accommodate the bar width dimension 46 of the grill support bar 42. The bar height dimension 48 is slightly smaller than the square side dimension 133 of the square crosssection 132 of the locking member 18.

The curved side portion 146 of the "J" shaped opening 140 corresponds in dimension to one half of the post circumference 32 of the post 12 and describes a half circle opening 150 (180° arc) having a center 152. The half circle openings 150 are oriented 180° opposed to each other. Thus, each half circular opening 150 is suitably dimensioned to snugly fit around a one half circumference portion of the post circumference 32. The linear side portion 144 of the "J" shaped opening 140 joins the beveled side portion 142 to the curved side portion 146. The curved side portion 146 of the "J" shaped opening 140 has a terminal end 154 which is spaced from the sidewall 112 having the angled opening 134, by at least the thickness 130 of the sidewall 112. Each of the angled sides 136, 138 of the angled opening 134 is contiguous with one of the beveled side portions 142 of the "J" shaped openings 140. The two curved side portions 146 of the slot 120 are disposed in a spaced relationship oriented 180° apart, with centers 152 aligned, spaced by a height 155 of sidewalls 112, 116 and sharing a same vertical geometric axis 156 extending between the center 152 of each respective half circle opening 150. Preferably, the locking member vertical axis 156 of locking member 18 is equidistant from opposed open ends 126, 128 and penetrates a pair of sidewalls 114, 118. The vertical axis 156 is spaced from the nonpenetrated sidewall 116.

In the preferred embodiment, in crosssection as shown in FIGS. 6–11 two curved side portions 146 are separated by square side dimension 133. When the locking member is in use engaged about the post 12, vertical geometric axis 156 of the curved side portion 146 of the slot 120 is coincident with the post vertical axis 34. An angle ⊖ is the inclination of angled sides 138, 136 of the angled opening 134 with respect to an edge 139 of sidewall 112 and an opposite side edge 141 of sidewall 112 respectively. The angle ⊖ is dependent on the post diameter 30, and the alignment of the centers 152 of the opposing 180° curved side portions 146 (e.g., having the centers 152 sharing the same vertical geometric axis 156 as the post vertical axis 34). The angle ⊖ is not 0°, 90°, 180°, 270° or 360°, but rather is an acute angle. Thus, the angle opening 134 is noncoincident with the vertical axis 156 of the locking member 18.

Figure 10:
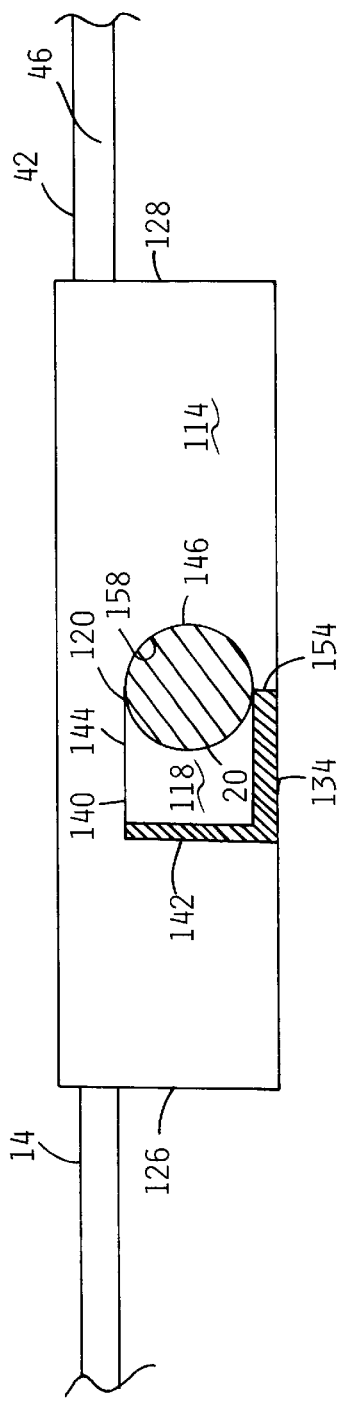
FIG. 10 is a top view of the locking member taken through section 10—10 of FIG. 3.
Figure 11:
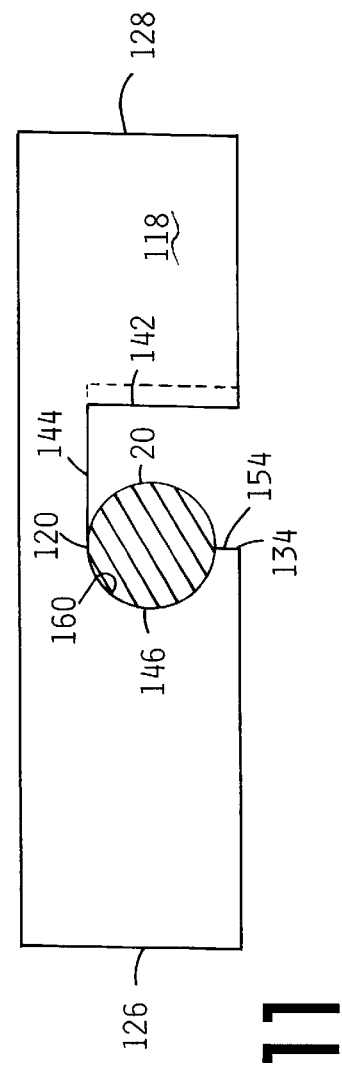
FIG. 11 is a top view of the locking member taken through section 11—11 of FIG. 3.

The locking member 18 is retained in position on the post 12 by engaging the post body 20 within slot 120. The post body 20 is received through the angled opening 134 of slot 120 between sides 136 and 138 and rests against the opposing curved side portions 146 of the "J" shaped openings 140 of slot 120. In this position, the vertical geometric axis 156 extending between the centers 152 of each half circle opening 150 is coincident with the post vertical axis 34. As best shown in FIGS. 10 and 11, showing the engagement of the locking member 18 with the post circumference 32, a half circumference portion 158 of the post circumference 32 of the post 12 (e.g. 180° of coverage of the circumference) rests on curved side portion 1 46 half circle opening 150 of slot 120 in sidewall 114 while simultaneously, an opposite half circumference portion 160 of post circumference 32 of the post 12 (e.g. 180° of coverage of the circumference) rests against the curved side portion 146 half circle opening 150 of slot 120 in sidewall 118. Each half circle opening 150 has a height which is equal to the sidewall thickness 130. The half circumference portions 158, 160 are opposed 180° apart and are spaced from each other by the square side dimension 133 of the square crosssection 132 on an interior of the locking member 18 and by the height 155 of the sidewalls 112, 116 on an exterior of the locking member 18. Thus, the locking member 18 advantageously provides 360° coverage about the circumference 32 of the post 12, since the curved side portions 146 are oriented 180° opposed from one another.

To assemble the portable grill 10, it is only necessary to drive the pointed lower end 24 of the post 12 into the ground 28. This can be done by striking the post cap 26 with a hammer (not shown). Once the post 12 is firmly implanted into the ground 28, the grill support member 14 is threaded grill handle 56 first, through the open ends 126, 128 of the locking member 18. The grill support bar 42 is oriented within the crosssection 132 of the locking member 18 with the bar width 46 dimension directly under the linear side portion 144 of the slot 120 and with the bar height dimension 48 directly adjacent the fourth side 116 of the locking member 18. The bar height dimension of bar 42 is dimensioned to closely fit within the crosssection 132 of the locking member 18 and to be approximately the same dimension as the square side dimension 133. The bar width dimension 46 is dimensioned to fit closely between the post circumference 32 and sidewall 118 of the locking member. By "closely fit" it is meant that the tolerance is approximately 0.16 cm (¹⁄₁₆ inches) or less to allow in-out travel of the support bar 42 in the locking member 18.

The grill grate 16 is affixed to the grill support member 14 using the adapter plates 90, 92 and fastened with the hardware 96 as previously described. The post body 20 of the post 12 is then slipped into the angled opening 134 in the slot 120 in the locking member 18. The weight of the grill grate 16 engages the opposed 180° curved side portions 146 of the "J" shaped openings 140 of slot 120 against the post body 20. As best shown in FIG. 3, the grill grate 16 is moved by a user through various positions by using the grill support bar 42 and grill handle 56 and controlling the position by holding the grill support bar 42 with one hand of the user and by moving the grill handle 56 with the other hand of the user. For example, holding the grill support bar 42 with one hand of the user and pushing downward on the grill handle 56 with the other hand of the user and lifting the support bar 42 up or down allows the user vertical (up/down) movement of the grill grate 16 about the post 12. Applying side force with one of the user's hand on the grill handle 56 rotates the grill support bar 42 about the post body 20 and allows the user full 360° rotation of the grill grate 16 about the post 12 in either direction. Holding the grill support bar 42 with one hand of the user and pushing downward on the grill handle 56 with the user's other hand and pulling the grill handle 56 permits the user to slide the grill support bar 42 holding the grill grate 16 in and out through the locking member 18. Thus, the user enjoys translational, horizontal movement of the grill grate 16.

Figure 14:
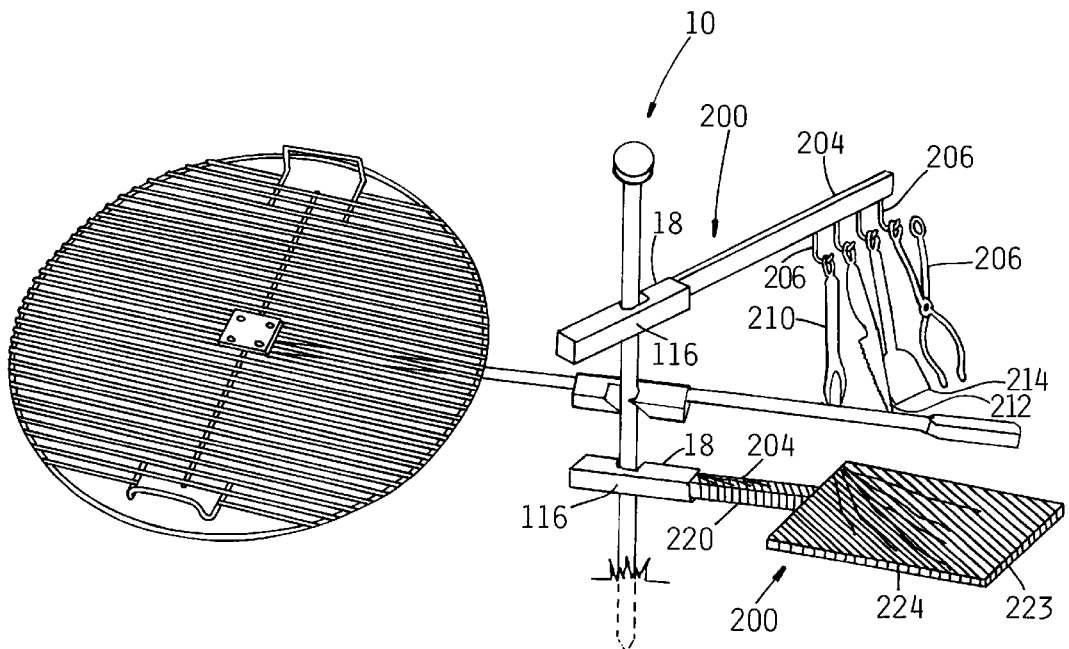
FIG. 14 is a pictorial view of the portable grill of the present invention using the grill accessory holders of FIGS. 12 and 13.
Figure 12:
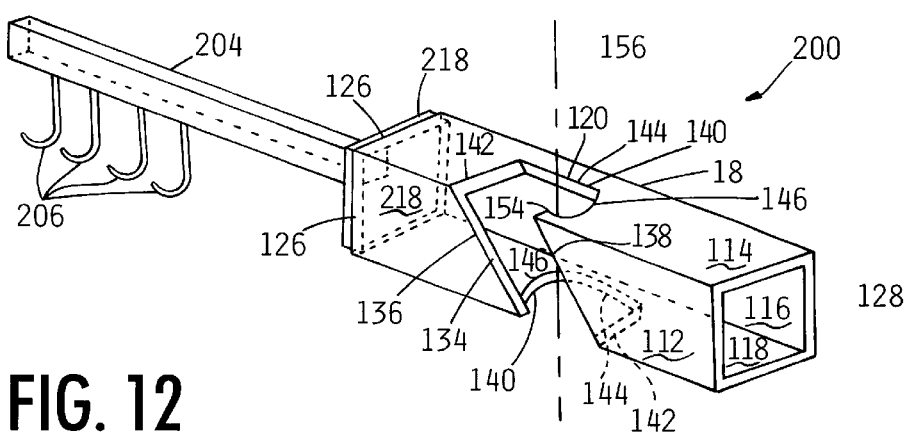
FIG. 12 is a perspective view of a grill accessory holder of the present invention, which uses the locking member of FIG. 6.
Figure 13:
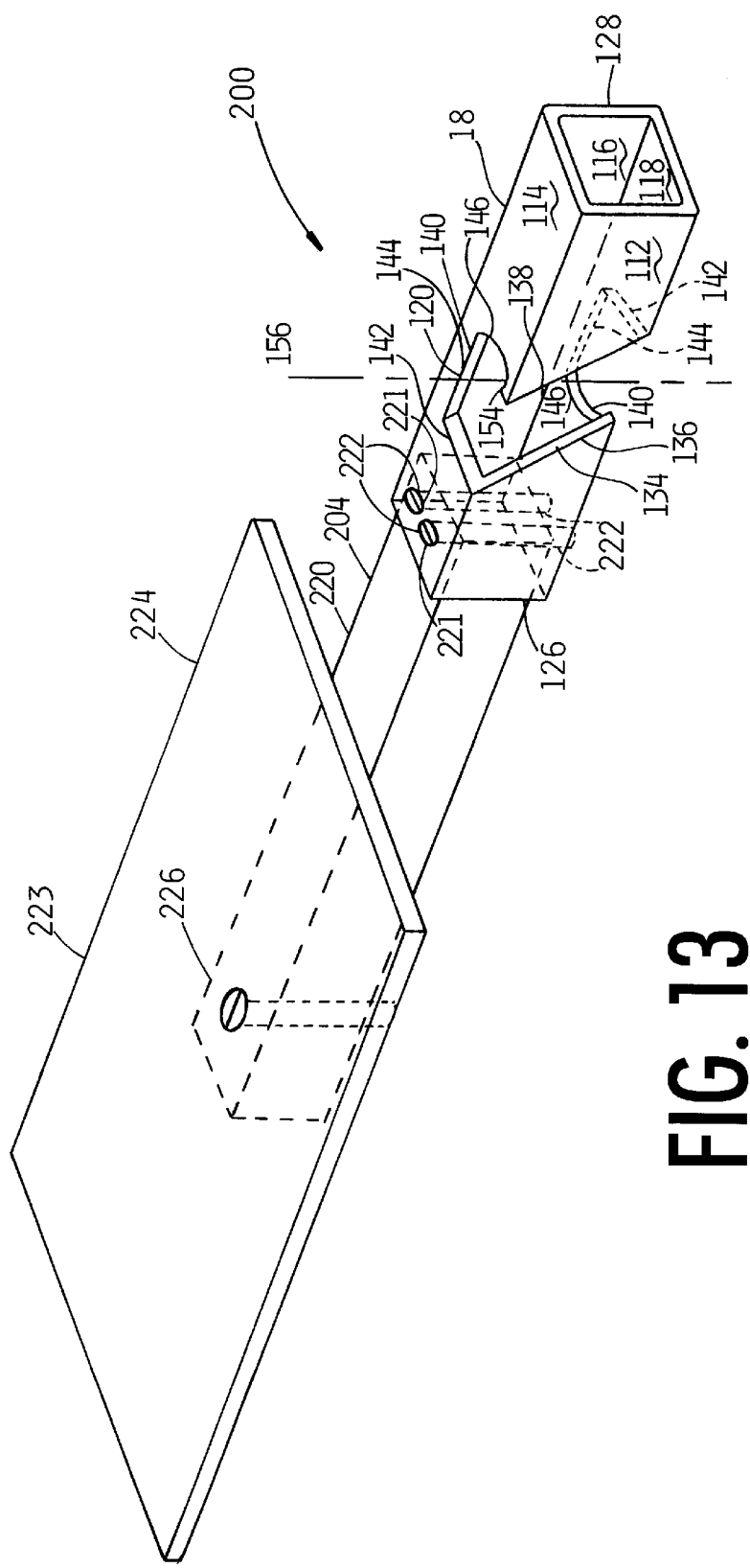
FIG. 13 is a perspective view of another grill accessory holder of the present invention, which uses the locking member of FIG. 6.

In yet another aspect of the invention, a grill accessory holder 200 is provided. As best shown in FIGS. 12 and 13, the locking member 18 of the present invention of FIGS. 6–9 may be adapted to hold grilling accessories 202. Grilling accessories 202 include, but are not limited to, forks, knives, spatulas, tongs, platters and shelves. FIG. 14 shows the portable grill 10 using the grill accessory holders 200 shown in FIGS. 12 and 13.

The grill accessory holder 200 of the present invention, as best shown in FIGS. 12–14 includes the metal locking member 18 as previously described herein before, which elements are identically numbered are incorporated by reference herein. The locking member 18 when modified as follows is also called the grill accessory locking member when referring to the grill accessory holder 200. The grill accessory holder 200 further includes an arm member 204 extending from the open end 126 of the locking member 18. FIG. 12 shows a first embodiment of the grill accessory holder 200 of the present invention, having locking member 18 with the arm member 204 extending from the end 126 of the locking member 18. The arm member 204 has one or more hooks 206 thereon, for holding a grilling utensil (e.g., a grilling accessory), such as, but not limited to a fork 210, a knife 212, a spatula 214, a pair of tongs 216, etc. Preferably in this embodiment, the arm member 204 and hooks 206 are made of metal, preferably a low carbon steel. Preferably a metal end plate 218 is welded to the locking member 18 closing the end 126. Preferably metal end plate 218 is a low carbon steel. The arm member 204 is preferably welded to the end plate 218.

FIG. 13 shows a second embodiment of the grilling accessory holder 200 of the present invention. This embodiment includes a grill accessory metal locking member 18 as described previously, an arm member 204 and a shelf 223. The shelf 223 is mounted on the arm member 204. Preferably, the arm member 204 is a wooden arm 220 fixedly attached to the grill accessory locking member 18 with conventional fastener hardware 221, such as but not limited to screws, bolts and rivets. Hardware 221 is mounted in openings 222 disposed on sidewalls 114, 118 near the open end 126 of the locking member 18. Preferably, the shelf 223 is a wooden platter 224 for serving food. Shelf 23 is mounted on the wooden arm 220, using conventional fastening hardware 226, such as, but not limited to, threaded screws, bolts and rivets. However, other suitable materials for fabricating the arm member 204, shelf 223 or platter 224 include, but not limited to stainless steel, plastics, or Corian™ solid surface material (made by DuPont, de Nemour and Co., Willimington, Del.). When the arm 204 and shelf 223 are made of metal, they may be suitably welded, soldered or riveted to each other and to the locking member 18. When the arm 204 is made of metal, it may be suitably welded, soldered or riveted to the locking member 18.

To use the grill accessory holders 200 shown in FIGS. 12 and 13, the post body 20 is slipped into the angled opening 134 of slot 120 in the locking member 18, the weight of the arm member 204, plus any weight of any grilling accessory, e.g., fork knife, spatula tongs, platter, shelf, etc., engages the opposed curved side portions 146 of the "J" shaped openings 140 against the post body 20. The grill accessory holder 200 is moved through various positions by holding the arm member 204 with one hand of the user. The position of the grill holder accessory 200 is controlled by moving the arm member 204. For example, lifting upwardly on the arm member 204 and lifting the arm member 204 up or lowering the arm member 204 down will allow the user vertical movement of the grill accessory holder 200 about the post 12. Applying side force on the arm member 204 and rotating the arm member 204 about the post body 20 allows full 360 rotation of the grill accessory holder 200 about the post 12.

Figure 15:
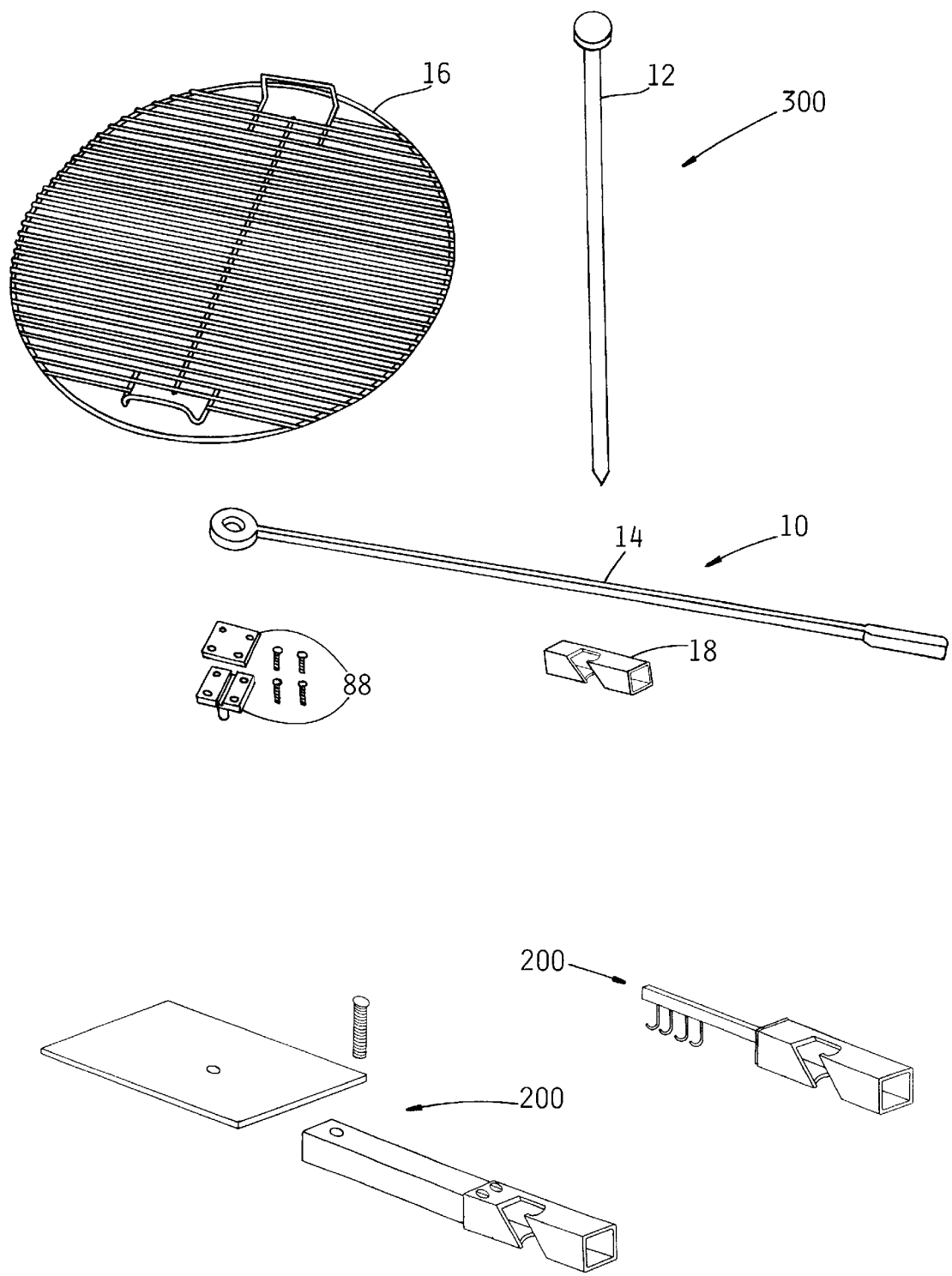
FIG. 15 is a pictorial view of a portable grill kit of the present invention.

The grill of the present invention is further a portable grill kit as shown in FIG. 15. The portable grill kit 300 includes the portable grill 10 as previously described herein and shown in FIGS. 1–11, which description and drawing is incorporated by reference herein. The grill 10 includes the vertical post 12, the grill support member 14, the grill grate 16, the grate adapter mechanism 88 for mounting the grill grate 16 on the grill support member 14, and the locking member 18 for attaching the grill support member 14 to the vertical post 12. The grill kit 300 may also include the grill accessory holders 200 as described herein and shown in FIGS. 13 and 14, which description and drawing is incorporated by reference herein.

Having described the invention in general, the following is a specific example of the portable grill of the present invention.

EXAMPLE 1

A portable grill of the following dimensions was built. The metal materials used for the vertical post, the post cap, the grill handle, the cylinder on the grill grate receiver and grate adapter pin of the portable grill, were 1045 TGP (Turned Ground Polished Steel) available from Jorgensen Steel, Chicago, Ill. The grill support bar and the grate adapter plate were made of 1018 cold rolled steel, available from Jorgensen Steel of Chicago, Ill. The series "10", e.g., 1045 and 1018, (e.g., the first two numbers of the 4 number identifier) indicate low carbon steels. The vertical post was made of a cylindrical 1045 TGP steel metal rod about 1.90 cm (¾ inch) in diameter and about 138 cm (54.5 inches) in length. One end of the rod was machined to a point. The other end was flat. A post cap was made by cutting a counter bore recess about 0.32 cm (⅛) inch deep into an approximately 1.59 cm (⅝ inch) long by 3.81 cm (1.5 inch) diameter 1045 TGP steel metal rod. The flat end of the rod was inserted into the counterbore and gas tungsten arc welded (TIG weld).

The grill support member was made by cutting an approximately 0.48 cm (3/16 inch) wide by 2.54 cm (1 inch) high by 76.2 cm (30 inch) long 1018 cold rolled steel metal bar. An approximately 10.2 cm (4 inch) long by approximately 2.54 cm (1 inch) diameter 1045 TGP steel metal rod was cut for the handle. One end of the rod was cut with a 1.27 cm (half inch) radius of curvature. The opposite end was cut with a 45° chamfer. A slot was cut in the chamfered end to accommodate the end of the bar. The grill grate receiver was made of a cylinder of 1045 TGP steel metal approximately 3.81 cm (1.5 inch) in diameter and about 2.54 cm (1 inch) in height. A 0.48 cm (3/16 inch) wide by 0.48 cm (0.19 inch) deep slot was cut onto the circumference of the cylinder in an axial direction. A 1.31 cm (33/64 inch) diameter inner throughhole was drilled into the cylinder in an axial direction. A 1.90 cm (¾ inch) by 90° countersink was made to one end of the cylinder adjacent the throughhole. One end of the grill support bar was gas tungsten arc welded to the slot in the grill handle. The other end of the grill support bar was also gas tungsten arc welded to the grill grate receiver.

A commercial grill grate, Weber™ replacement grill grate part #70901, (Weber-Stephens Products, Inc., Palatine, Ill.) was purchased from an Ace Hardware Store (Ace Hardware Corporation, Oak Brook, Ill.), for use in the portable grill. The grill grate was about 57.15 cm (22½ inches) in diameter having parallel rods spaced about 1.27 cm (½ inches) apart and having a rib about less than 0.48 cm (3/16 inches) in diameter. The rib was made of approximately #8 gauge wire, approximately 0.41 cm (0.162 inches). The rib bisected the grill and intersected the rods. The rib was located on the lower surface of the grill, that is, the surface of the grill that was oriented to the fire.

A grate adapter mechanism was made having an upper adapter plate and a lower adapter plate. The upper adapter plate was made from an approximately 5.08 cm (2 inch) by 5.08 cm (2 inch) square by 0.32 cm (⅛ inch) thick plate of 316 series stainless steel available from Jorgensen Steel, Chicago, Ill. The lower adapter plate was made of an approximately 5.08 cm (2 inches) by 5.08 cm (2 inches) square by 0.95 cm (⅜ inch) thick plate of 1018 cold rolled steel metal. A hole was drilled at each of the four corners of each plate. The holes were positioned so that they were in alignment when the plates were stacked one on top of the other. A groove approximately 0.47 cm (0.187 inch) deep by about 0.47 cm (0.187 inch) wide was made on the upper face of the lower adapter plate. This groove was dimensioned to accept the rib on the grill grate. A recess was made on the lower surface of the lower adapter plate. The recess was centered on the lower adapter plate and was made approximately 1.27 cm (½ inch) in diameter and about 0.32 cm (0.125 inches) deep. The adapter pin was made of an about 1.27 cm (½ inch) diameter 1045 TGP steel rod that was cut about 3.18 cm (1¼ inches) long. One end of the rod was chamfered at about a 45° with an offset of about 0.15 cm (0.06 inches). The grate adapter pin was gas tungsten arc welded to the recess in the lower grate adapter plate. The grate adapter plates were centered above and below the grill center with the holes in the plates aligned and with the grate rib resting in the lower adapter plate. The adapter plates were fastened holding the grill in a sandwiched position using four stainless steel button head screws which were threaded through the aligned openings.

The locking member was made of approximately 0.32 cm×3.18 cm×3.18 cm (⅛ inch×1¼ inch×1¼ inch) steel metal tubing available from Jorgensen Steel, Chicago, Ill. The tubing piece was approximately 12.7 cm (5 inches) long. The wall thickness of each of the sidewalls was about 0.32 cm (⅛ inches). The square side dimension of the interior crosssection was about 2.54 cm (1 inch). The slot for accepting and holding the post penetrated three of the four sidewalls. The curved portions of the "J" shaped openings were made by drilling about a 1.83 cm (²³⁄₃₂ inch) diameter hole through a pair of opposing sidewalls with the center of the hole equidistant from the open ends of the tubing and spaced about 1.90 cm (¾ inches) from the fourth sidewall not penetrated by the slot. The hole was reamed to about 1.90 cm (¾ inch) in diameter. Then the linear side, beveled side portion and angled opening were made. The linear side extended about 2.22 cm (⅞ inches) deep, the beveled side portion was about 2.22 cm (⅞ inches) long. The angled opening of the slot was centered about one sidewall and extended at a 53.1° angle ±0.5° from a top edge of the sidewall. The spacing between the angled sides was 1.90 cm (+0.013 cm/−000.00 cm) (¾ inch wide (+0.005 inches/−0.000 inches)) by 2.22 cm (0.875 inch) deep. Thus, the beveled side portion was about 2.22 cm (0.875 inches) long. The "J" shaped opening had an axis which was centered 6.35 cm (2.5 inches) from each of the open ends and spaced 1.90 cm (¾ inches) from the fourth sidewall which was not penetrated by the slot. The terminal end of the curved opening was spaced 0.32 cm (⅛ inches) from the sidewall having the angled opening.

Other suitable materials for the portable grill of the present invention include, but are not limited to, other carbon steels and stainless steels. However, most preferably low carbon steels are used because of the ease of machining and lowered cost.

While the present invention has now been described and exemplified with some specificity, those skilled in the art will appreciate the various modifications, including variations, additions, and omissions, that may be made in what has been described. Accordingly, it is intended that the modifications also be encompassed by the present invention and that the scope of the present invention be limited solely by the broadest interpretation that lawfully can be accorded the appended claims.

I claim:

1. A portable grill comprising: a vertical post, a grill grate, a grill support member and a locking member for attaching said grill support member to said vertical post, said vertical post having a post diameter, post circumference and post axis, said grill support member having a grill support bar with two opposite ends, a handle on one of said ends and a grill grate receiver on said other end, said grill grate mounting upon said grill grate receiver, and said locking member having four sidewalls disposed in two parallel spaced opposed pairs, with said pairs generally perpendicular to each other and forming a tube having opposed open ends, said locking member having a slot therein penetrating three of said sidewalls with said fourth sidewall unpenetrated by said slot, said slot forming an acute angled opening penetrating one sidewall of one of said pairs of sidewalls, said angled opening having two angled sides spaced in parallel relationship to each other, said angled opening dimensioned for receiving said post diameter, said slot forming a pair of identically dimensioned "J" shaped openings, with each "J" shaped opening disposed in one of said two opposed sidewalls of the other said pair of sidewalls, each "J" shaped opening having a beveled side portion, a linear side portion and a half circle curved side portion, said beveled side portion parallel to said open ends of said locking member, said linear side portion parallel with said fourth sidewall of said locking member, said curved side portion dimensioned to receive a one half circumference portion of said post circumference, said linear side portion extending between said beveled side portion and said curved side portion, each said curved side portion of said "J" shaped opening disposed in opposed 180° orientation with the other said curved portion of said "J" shaped opening.

2. The portable grill of claim 1, said grill grate receiver including a cylinder having an inner throughhole penetrating said cylinder axially, a cylinder circumference having a longitudinal slot therein, and two cylinder ends, one said cylinder end having a beveled angled portion surrounding said inner throughhole, one end of said grill support bar affixed to said longitudinal slot on said cylinder circumference.

3. The portable grill of claim 2, wherein said grill grate has a plurality of spaced rods and a center rib bisecting said grill grate and intersecting said spaced rods, said portable grill further comprising: a grate adapter mechanism, said grate adapter mechanism having an upper adapter plate, a lower adapter plate, and fasteners for fastening said upper plate to said lower adapter plate, said upper adapter plate having a plurality of openings therethrough for accepting said fasteners, said lower adapter plate having a plurality of openings therethrough aligned with and dimensioned to align with said openings on said upper adapter plate, said lower adapter plate having an upper surface adjacent said grill grate and an opposite lower surface, said upper surface having a groove thereon dimensioned to accept said rib, said lower adapter plate having a grate adapter pin protruding from said lower surface, said grate adapter pin suitably dimensioned to fit into said inner throughhole of said cylinder of said grill support member.

4. The portable grill of claim 1, further comprising: a grill accessory holder having a grill accessory locking member and an arm attached to said grill accessory locking member for holding a grill accessory, said grill accessory locking member having four sidewalls disposed in two parallel spaced opposed pairs, with said pairs generally perpendicular to each other and forming a tube having opposed open ends, said locking member having a slot therein penetrating three of said sidewalls with said fourth sidewall unpenetrated by said slot, said slot forming an acute angled opening penetrating one sidewall of one of said pairs of sidewalls, said angled opening having two angled sides spaced in parallel relationship to each other, said angled opening dimensioned for receiving said post diameter, said slot forming a pair of identically dimensioned "J" shaped openings, with each "J" shaped opening disposed in one of said two opposed sidewalls of the other of said pair of sidewalls, each "J" shaped opening having a beveled side portion, a linear side portion and a half circle curved side portion, said beveled side portion parallel to said open ends of said locking member, said linear side portion parallel with said fourth sidewall of said locking member, said curved side portion dimensioned to receive a one half circumference portion of said post circumference, said linear side portion extending between said beveled side portion and said curved side portion, each said curved side portion of said "J" shaped opening disposed in opposed 180° orientation with the other said curved portion of said "J" shaped opening.

5. The portable grill of claim 4, wherein the grill accessory holder further comprises a shelf attached to said arm member.

6. The portable grill of claim 4, wherein the grill accessory holder further comprises at least one hook attached to said arm member.

7. A locking member for use with a portable grill having (a) a vertical post having a post diameter, post circumference and post axis, (b) a grill support member having a grill support bar with two opposite ends, a handle on one of said ends, (c) a grill grate and (d) a grill grate receiver on said other end of said support bar, for mounting said grill grate upon, said locking member for attaching said grill support member to said vertical post, said locking member comprising: four sidewalls disposed in two parallel spaced opposed pairs, with said pairs generally perpendicular to each other and forming a tube having opposed open ends, said locking member having a slot therein penetrating three of said sidewalls with said fourth sidewall unpenetrated by said slot, said slot forming an acute angled opening penetrating one sidewall of one of said pairs of sidewalls, said angled opening having two angled sides spaced in parallel relationship to each other, said angled opening dimensioned for receiving said post diameter, said slot forming a pair of identically dimensioned "J" shaped openings, with each "J" shaped opening disposed in one of said two opposed sidewalls of the other of said pair of sidewalls, each "J" shaped opening having a beveled side portion, a linear side portion and a half circle curved side portion, said beveled side portion parallel to said open ends of said locking member, said linear side portion parallel with said fourth sidewall of said locking member, said curved side portion dimensioned to receive a one half circumference portion of said post circumference, said linear side portion extending between said beveled side portion and said curved side portion, each said curved side portion of said "J" shaped opening disposed in opposed 180° orientation with the other said curved portion of said "J" shaped opening.

8. A grate adapter mechanism for use in a portable grill having (a) a grill grate having a plurality of spaced rods and a center rib bisecting said grill grate and intersecting said spaced rods, (b) and a grill support member having a grill grate receiver and a grill support bar, wherein said grill grate receiver includes a cylinder having an inner throughhole penetrating said cylinder axially, a cylinder circumference having a longitudinal slot on said cylinder circumference, and two cylinder ends, one said cylinder end having a beveled angled portion surrounding said inner throughhole, said grill support bar affixed to said longitudinal slot on said cylinder circumference, said grate adapter mechanism comprising: an upper adapter plate, a lower adapter plate, and fasteners for fastening said upper plate to said lower adapter plate, said upper adapter plate having a plurality of openings therethrough for accepting said fasteners, said lower adapter plate having a plurality of openings therethrough aligned with and dimensioned to correspond to said openings on said upper adapter plate, said lower adapter plate having an upper surface adjacent said grill grate and an opposite lower surface, said upper surface having a groove thereon dimensioned to accept said rib, said lower adapter plate having a grate adapter pin protruding from said lower surface, said grate adapter pin suitably dimensioned to fit into said inner throughhole of said cylinder of said grill support member.

9. A grill accessory holder for use in a portable grill having a vertical post having a post diameter, post circumference and post axis, said grill accessory holder comprising a grill accessory locking member and an arm attached to said grill accessory locking member, said grill accessory locking member having four sidewalls disposed in two parallel spaced opposed pairs, with said pairs generally perpendicular to each other and forming a tube having opposed open ends, said locking member having a slot therein penetrating three of said sidewalls with said fourth sidewall unpenetrated by said slot, said slot forming an acute angled opening penetrating one sidewall of one of said pairs of sidewalls, said angled opening having two angled sides spaced in parallel relationship to each other, said angled opening dimensioned for receiving said post diameter, said slot forming a pair of identically dimensioned "J" shaped openings, with each "J" shaped opening disposed in one of said two opposed sidewalls of the other of said pair of sidewalls, each "J" shaped opening having a beveled side portion, a linear side portion and a half circle curved side portion, said beveled side portion parallel to said open ends of said locking member, said linear side portion parallel with said fourth sidewall of said locking member, said curved side portion dimensioned to receive a one half circumference portion of said post circumference, said linear side portion extending between said beveled side portion and said curved side portion, each said curved side portion of said "J" shaped opening disposed in opposed 180° orientation with the other said curved portion of said "J" shaped opening.

10. The grill accessory holder of claim 9, further comprising a shelf attached to said arm member.

11. The grill accessory holder of claim 9, further comprising at least one hook attached to said arm member.

12. A portable grill kit comprising: a vertical post, a grill support member, a grill grate and a locking member for attaching said grill support member to said vertical post, said vertical post having a post diameter, post circumference and post axis, said grill support member having a grill support bar with two opposite ends, a handle on one of said ends and a grill grate receiver on said other end, said grill grate receiver for mounting said grill grate upon, and said locking member having four sidewalls disposed in two parallel spaced opposed pairs, with said pairs generally perpendicular to each other and forming a tube having opposed open ends, said locking member having a slot therein penetrating three of said sidewalls with said fourth sidewall unpenetrated by said slot, said slot forming an acute angled opening penetrating one sidewall of one of said pairs of sidewalls, said angled opening having two angled sides spaced in parallel relationship to each other, said angled opening dimensioned for receiving said post diameter, said slot forming a pair of identically dimensioned "J" shaped openings, with each "J" shaped opening disposed in one of said two opposed sidewalls of the other of said pair of sidewalls, each "J" shaped opening having a beveled side portion, a linear side portion and a half circle curved side portion, said beveled side portion parallel to said open ends of said locking member, said linear side portion parallel with said fourth sidewall of said locking member, said curved side portion dimensioned to receive a one half circumference portion of said post circumference, said linear side portion extending between said beveled side portion and said curved side portion, each said curved side portion of said "J" shaped opening disposed in opposed 180° orientation with the other said curved portion of said "J" shaped opening.

13. The portable grill kit of claim 12, wherein said grill grate receiver includes a cylinder having an inner throughhole penetrating said cylinder axially, a cylinder circumference having a longitudinal slot on said cylinder circumference, and two cylinder ends, one said cylinder end having a beveled angled portion surrounding said inner throughhole, said grill support bar affixed to said longitudinal slot on said cylinder circumference.

14. The portable grill kit of claim 13, wherein said grill grate has a plurality of spaced rods and a center rib bisecting said grill grate and intersecting said spaced rods, said portable grill further comprising a grate adapter mechanism, said grate adapter mechanism having an upper adapter plate, a lower adapter plate, and fasteners for fastening said upper plate to said lower adapter plate, said upper adapter plate having a plurality of openings therethrough for accepting said fasteners, said lower adapter plate having a plurality of openings therethrough aligned with and dimensioned to correspond to said openings on said upper adapter plate, said lower adapter plate having an upper surface adjacent said grill grate and an opposite lower surface, said upper surface having a groove thereon dimensioned to accept said rib, said lower adapter plate having a grate adapter pin protruding from said lower surface, said grate adapter pin suitably dimensioned to fit into said inner throughhole of said cylinder of said grill support member.

15. The portable grill kit of claim, 12 further comprising a grill accessory holder comprising a grill accessory locking member and an arm attached to said grill accessory locking member, said grill accessory locking member comprising, having four sidewalls disposed in two parallel spaced opposed pairs, with said pairs generally perpendicular to each other and forming a tube having opposed open ends, said locking member having a slot therein penetrating three of said sidewalls with said fourth sidewall unpenetrated by said slot, said slot forming an acutely angled opening penetrating one sidewall of one of said pairs of sidewalls, said angled opening having two angled sides spaced in parallel relationship to each other, said angled opening dimensioned for receiving said post diameter, said slot forming a pair of identically dimensioned "J" shaped openings, with each "J" shaped opening disposed in one of said two opposed sidewalls of the other of said pair of sidewalls, each "J" shaped opening having a beveled side portion, a linear side portion and a half circle curved side portion, said beveled side portion parallel to said open ends of said locking member, said linear side portion parallel with said fourth sidewall of said locking member, said curved side portion dimensioned to receive a one half circumference portion of said post circumference, said linear side portion extending between said beveled side portion and said curved side portion, each said curved side portion of said "J" shaped opening disposed in opposed 180° orientation with the other said curved portion of said "J" shaped opening.

16. The portable grill kit of claim 15, wherein the grill accessory holder further comprises a shelf attached to said arm member.

17. The port able grill kit of claim 15, wherein the grill accessory holder further comprises at least one hook attached to said arm member.

18. A portable grill comprising: a vertical post, a grill support member, a grill grate and a locking member for attaching said grill support member to said vertical post,
    said vertical post having a post diameter, post circumference and post axis,
    said grill support member having a grill support bar with two opposite ends, a handle on one of said ends and a grill grate receiver on said other end,
    said grill grate for mounting on said grill grate receiver, and
    said locking member forming a four sided tubular member having opposed open ends and a locking member vertical axis disposed equidistant from said open ends and penetrating a pair of said sides of said tubular member, said locking member having a slot therein, said slot having an angled opening and also having a pair of spaced 180° opposed half circle openings each dimensioned to accept a one half circumference portion of said post circumference, each said half circle opening having a center on said locking member vertical axis, with said centers of said half circle openings being spaced from each other, said angled opening having two angled sides spaced in parallel relationship to each other, said angled opening dimensioned for receiving said post diameter, said angled opening noncoincident with said locking member vertical axis.

19. The portable grill of claim 18, wherein when said locking member is engaged with said post circumference, said locking member vertical axis is coincident with said post axis.

* * * * *